US006018870A

United States Patent [19]

Marschke et al.

[11] Patent Number: 6,018,870

[45] Date of Patent: Feb. 1, 2000

[54] SECTIONAL CONSTRUCTION FOR AXIALLY LONG ROLL

[75] Inventors: Dean D. Marschke, Madison; Carl R. Marschke, Phillips; Kenneth D. Danielson, Prentice, all of Wis.

[73] Assignee: Marquip, Inc., Phillips, Wis.

[21] Appl. No.: 09/160,979

[22] Filed: Sep. 25, 1998

[51] Int. Cl.[7] ..................... B23P 15/00

[52] U.S. Cl. ..................... 29/895.213; 29/895.2; 492/46

[58] Field of Search ..................... 29/895.2, 895.213, 29/525.14; 492/40, 45, 46

[56] References Cited

U.S. PATENT DOCUMENTS

| | | | |
|---|---|---|---|
| 2,080,027 | 5/1937 | Allsop et al. | 29/895.213 |
| 3,217,795 | 11/1965 | Cirrito et al. | 29/895.213 |
| 5,155,910 | 10/1992 | Henseler et al. | 29/895.213 |

*Primary Examiner*—Irene Cuda

*Attorney, Agent, or Firm*—Andrus, Sceales, Starke & Sawall

[57] ABSTRACT

A large diameter and axially long cylindrical roll is fabricated from axially short cylindrical roll sections to provide a roll with circumferentially spaced, parallel and axially extending steam passages through the outer cylindrical wall of the roll. Through bore portions, which are gun drilled in the short roll sections, are aligned with cylindrical pins that also provide backing material for the annular welds used to join the roll sections. By utilizing pins of weld backing material in the bore portions, the bores may be formed very close to the outer cylindrical surface of the roll, thereby enhancing heat transfer in the completed roll.

20 Claims, 3 Drawing Sheets

FIG. 4A
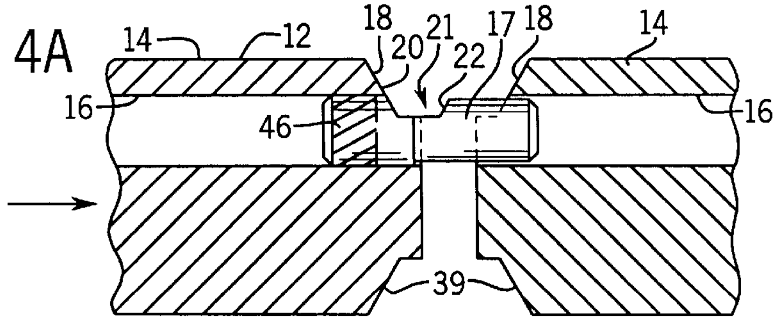
FIG. 4B
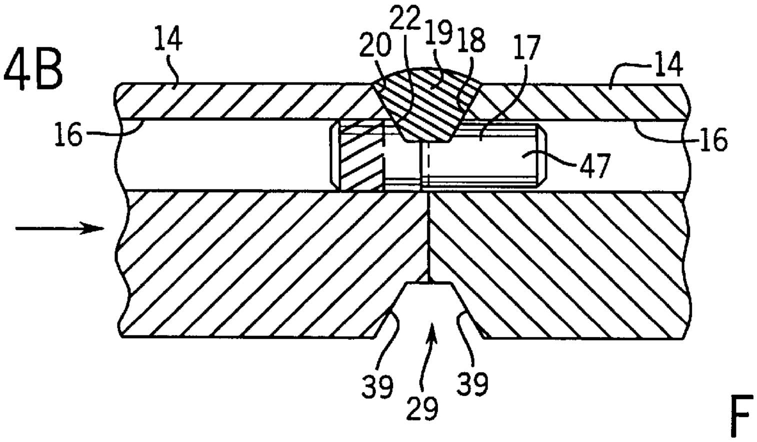
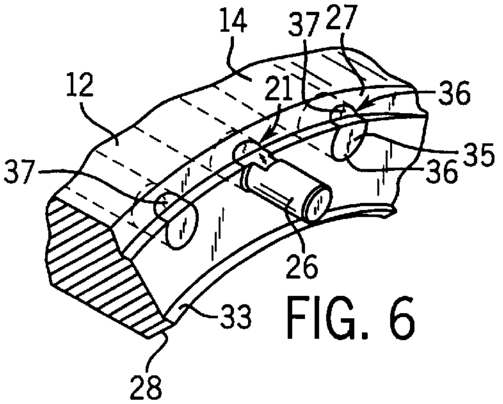
FIG. 6
FIG. 7
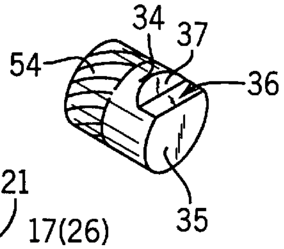
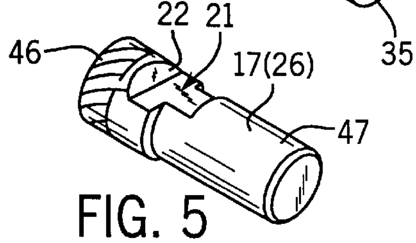
FIG. 5
FIG. 8
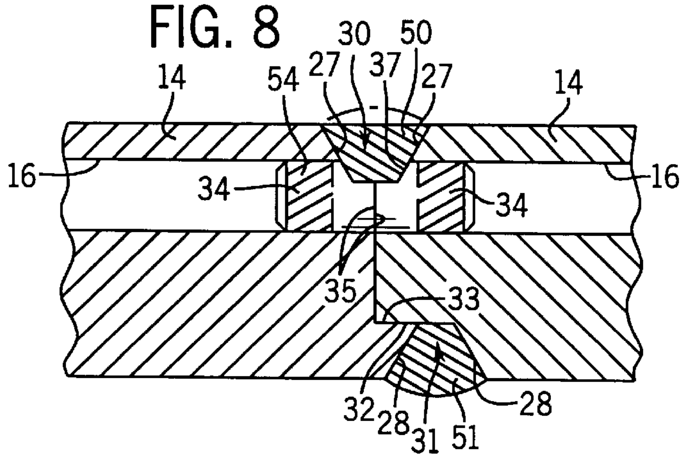

SECTIONAL CONSTRUCTION FOR AXIALLY LONG ROLL

BACKGROUND OF THE INVENTION

The present invention pertains to a method for fabricating an axially long cylindrical roll from shorter cylindrical wall sections and, more particularly, to a large diameter roll the outer cylindrical shell of which is provided with circumferentially spaced, axially extending steam and condensate bores.

Steam heated cylindrical rolls are well known in the art and are used in a wide variety of material treating applications. In one common application, webs of material to be treated are wrapped around the steam heated rotary roll which transfers heat to the web. Typically, steam is supplied to and condensate water removed from the interior of the roll via a non-rotating siphon system and connections to the roll shaft utilizing rotary joints for steam supply and condensate withdrawal. In order to optimize heat transfer from the steam to the outer surface of the drum, a preferable roll construction utilizes a plurality of axial passages formed in the interior of the cylindrical wall or shell of the roll. Steam is supplied to the axial passages at one end of the roll and condensate is removed from the passages at the opposite end of the roll.

In certain applications, such as in the paper industry, axially long and large diameter rolls are often used. These rolls may have a diameter of 72 inches (about 1830 mm) and an axial length of 400 inches (about 10 m). There is presently no known method for practically forming axial steam passages in a roll having an outer cylindrical shell of this length. One solution to this problem is shown in U.S. Pat. No. 3,217,795 where the cylindrical outer roll shell is formed by joining a number of axially shorter cylindrical wall sections, each of which is provided with cored or drilled axial bores which are aligned when the cylindrical roll sections are joined (as by welding) to form the final long cylindrical roll. However, a number of problems still remain in the fabrication of a roll of this kind. In a large diameter roll, there may be dozens or even hundreds of axial steam bores spaced circumferentially around the roll. It is very difficult to assure alignment of all of the bores from one cylindrical section to the next, even when the bores are formed with precision gun drilling methods. In addition, the desire to place the steam transfer bores as close to the outer cylindrical surface of the roll shell as possible has been compromised by the need to provide enough material thickness to accommodate an outer circumferential weld, joining the two cylindrical sections, of a depth sufficient to provide the necessary strength. In other words, the axial steam bores must be maintained radially inwardly from the outer surface of the shell a distance sufficient to preclude weld penetration into the bores when the roll sections are joined.

SUMMARY OF THE INVENTION

In accordance with the present invention, a roll fabrication method is provided in which axially short cylindrical roll sections, predrilled with a series of axial steam bores, are joined utilizing a roll section alignment system and process which also allows the axial steam bores to be placed very close to the outer roll surface. As a result, accurate alignment of the roll sections and the steam bores therein, as well as optimal heat transfer to the roll surface, are ensured.

In accordance with one embodiment of the method of the present invention, a number of cylindrical roll sections are formed, each having a plurality of circumferentially spaced, parallel and axially extending through bore portions. The cylindrical roll sections are aligned in circumferential abutting relation to lie on a common axis with the bore portions in the roll sections generally aligned. The abutting ends of adjacent bore portions are plugged with weld backing material. A common outer annular weld groove is formed in abutting outer cylindrical surface edge portions of the cylindrical roll sections and radially outer surface portions of the backing material. A continuous weld is then applied to the groove.

The cylindrical roll sections are preferably formed of steel and the bore portions are formed by drilling. In one embodiment, the drilling step comprises drilling axially aligned holes from opposite edges of the cylindrical roll sections.

The roll sections may be aligned by connecting a pair of aligned bore portions with a connecting pin, and providing the abutting edges of the roll sections with respective mating cylindrical pilot surfaces concentric with the common axis of the sections. The remaining bore portions may be plugged by inserting a stub pin into each of the abutting ends of adjacent bore portions, with the stub pins being provided with opposed faces that abut when the roll sections and bore portions are aligned. The stub pins are preferably held in the bore portions with an interference fit. Further, the stub pins are preferably provided with surface portions which define, when inserted and after aligning, the radially outer surface portions defining a part of the weld groove. The groove forming step may also include chamfering the cylindrical wall sections to form the surface edge portions of the weld groove prior to the alignment of the wall sections.

The method may also include the steps of forming a common inner annular weld groove defined by inner cylindrical surface edge portions of the wall sections, and applying a second continuous weld to the inner weld groove.

The backing material plugs, which may be of either weldable or non-weldable construction, are removed after welding. In all embodiments, the plugs preferably comprise pins and the step of removing the pins comprises redrilling the bore portions in which the pins are contained.

In accordance with a variant method of the present invention, an axially long, large diameter cylindrical roll shell, defined by outer and inner cylindrical surfaces, is fabricated from axially shorter cylindrical roll sections by a method comprising the steps of: forming a plurality of circumferentially spaced, parallel and axially extending bores through the roll sections; aligning a pair of roll sections in end-to-end abutment on a common axis and such that the bores are in axial alignment; inserting cylindrical pins of a weld backing material into the axial ends of the bores of said pair of roll sections, such that the pins substantially fill adjacent abutting bore ends; forming an annular groove in the outer cylindrical surface along the line of roll section abutment and to a depth sufficient to extend into the pins; and, welding the sections together with a continuous weld applied to the groove.

The aligning step may also comprise utilizing at least one of the pins as a common pilot pin bridging the sections and extending into both adjacent bore ends. The pin inserting step also preferably comprises rigidly securing one of the ends of each pin in the respective ends of the bores of a roll section prior to the aligning step, and causing the opposite ends of each of the pins to enter a bore end of the other roll section in the aligning step. Preferably, the outside diameters of the opposite ends of the pins are sized to provide a slip fit in the bore ends of the other roll section.

The method may also include the step of additionally welding the roll sections together along abutting inner cylindrical surface portions. This additional welding step may comprise forming an annular pilot ring with outer diameter surface portions that provide a tight fit on adjoining inner cylindrical surface portions of the wall sections, and welding opposite axial ends of the ring to the respective inner cylindrical surface portions of the respective wall sections.

BRIEF DESCRIPTION OF THE DRAWINGS

FIGS. 4A and 4B are sectional details, similar to FIG. 3, showing one embodiment of the present invention.

FIG. 5 is a perspective view of an alignment pin used in FIGS. 4A and 4B embodiment, as well as in other embodiments of the invention.

FIG. 6 is a perspective detail of a portion of one cylindrical roll section showing another embodiment of the invention.

FIG. 7 is a perspective view of a pin used in the FIG. 6 embodiment.

FIG. 8 is an enlarged sectional detail of two cylindrical roll sections utilizing the FIG. 7 pins.

DETAILED DESCRIPTION OF THE PREFERRED EMBODIMENTS

Figure 1:
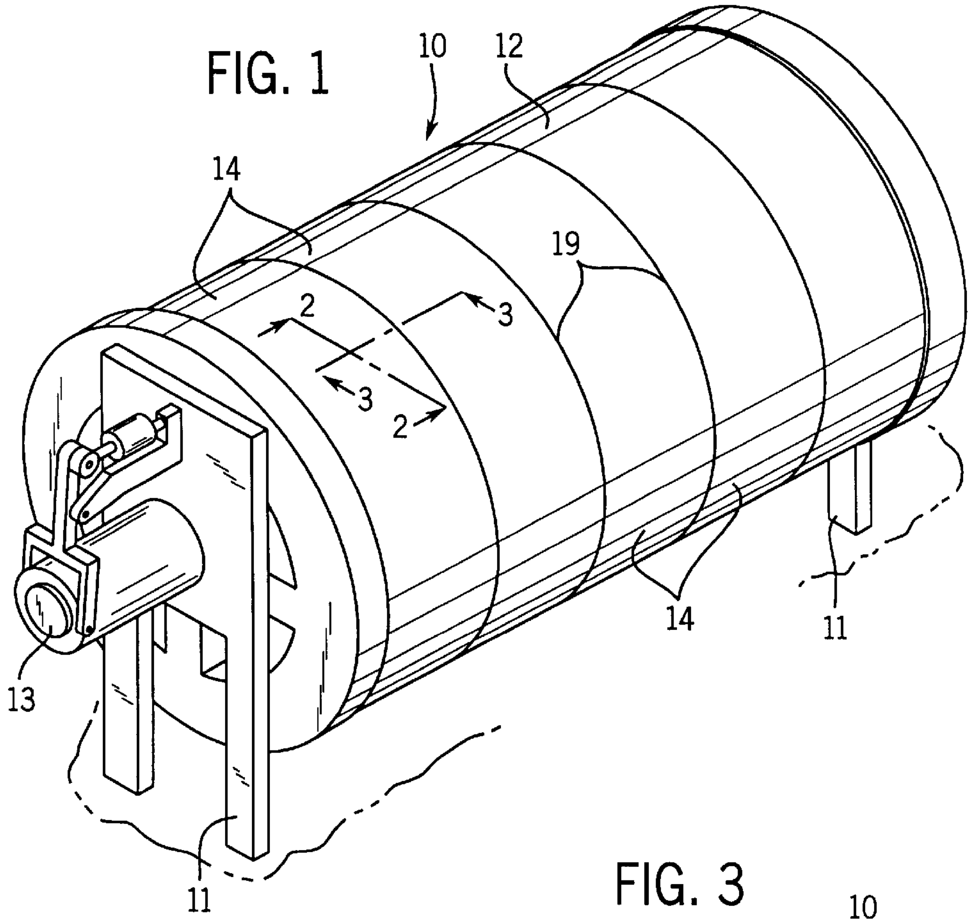
FIG. 1 is a perspective view of a rotary cylindrical roll formed from cylindrical roll sections in accordance with the method of the present invention.

The perspective view of FIG. 1 shows a cylindrical rotary drum or roll 10, supported for rotation on opposite end frames 11. The outer cylindrical surface 12 of the roll 10 is heated for the purpose of drying or otherwise treating a web of material traveling over the cylindrical surface. Typically, the roll 10 is heated with steam supplied through a rotary joint 13 which also serves to handle the return and discharge of condensate. Steam supply and condensate removal may be handled by methods and apparatus described in co-pending and commonly owned U.S. patent application Ser. No. 08/932,332, filed Sep. 17, 1997 and Ser. No. 09/089,124, filed Jun. 2, 1998, which are incorporated herein by reference.

In accordance with the method of the present invention, the cylindrical roll 10 is fabricated from a number of axially shorter cylindrical roll sections 14 which are joined in circumferential abutting relation to lie on a common axis to form an axially long, large diameter roll of a type that might be utilized, for example, to handle a web from a papermaking machine. The roll 10 may have a diameter of 72 inches (about 1830 mm) and an axial length of 400 inches (about 10 m). Such rolls are also constructed to accommodate web line speeds in excess of 6000 fpm (about 30 m/s), thus generating roll rotational speeds in excess of 320 rpm.

Figure 3:
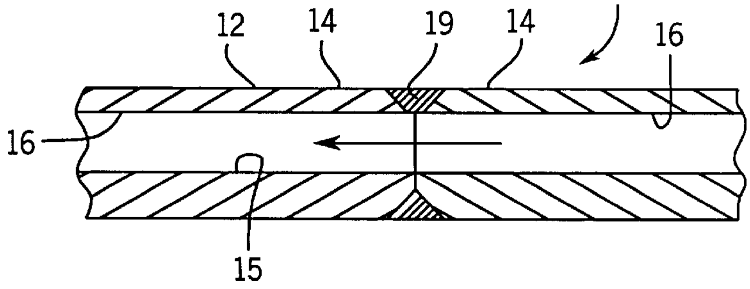
FIGS. 2 and 3 are enlarged sectional details taken, respectively, on lines 2—2 and 3—3 of FIG. 1.
Figure 2:
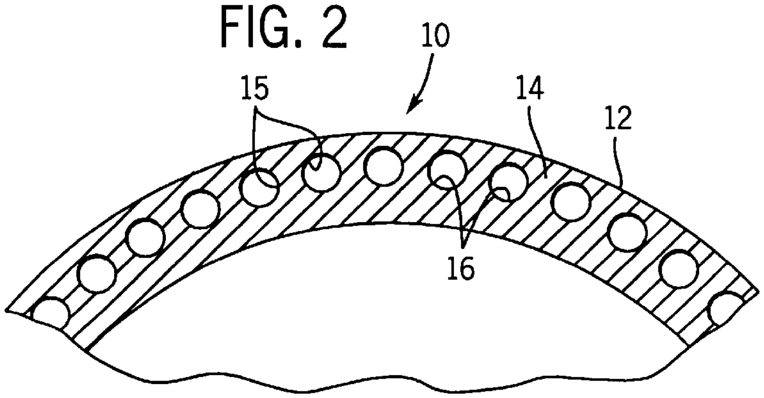

Referring also to FIGS. 2 and 3, the roll 10 is of the type in which the steam is supplied to one end of the roll and into the ends of a series of circumferentially spaced, parallel and axially extending through bores 15 in the cylindrical roll shell. With a large diameter (e.g. 72 inch) roll, and utilizing one inch (25 mm) through bores 15 spaced circumferentially on 1½ inch (38 mm) centers, about 150 through bores are required. In accordance with the method of the present invention, each of the cylindrical roll sections 14 is selected to have an axial length which is near the maximum length that will accommodate precision drilling of through bore portions 16 which may subsequently be aligned section-to-section to provide continuous through bores 15 in the final assembled roll 10.

It is also preferable to locate the through bores 15 as close to the outer roll surface 12 as possible in order to maximize the transfer of heat from steam in the bores to the roll surface. However, because the cylindrical roll sections 14 are preferably welded together with continuous circumferential welds, care must be taken to avoid weld penetration which would enter the bores and, therefore, prior art roll constructions have had to compromise optimal heat transfer by retaining an adequate thickness of material for welding. The other aspect of the present invention overcomes this problem and permits the through bore portions 16 to be drilled in the cylindrical roll sections 14 with as little as ¼ inch (about 6 mm) clearance from the outer cylindrical roll surface 12.

The cylindrical roll sections 14 may be formed of rolled steel or steel castings with a wall thickness of about 2 inches (about 50 mm) and an axial length which will permit precision drilling of the bore portions 16. In order to maximize the axial length of the roll sections 14, the method of the present invention contemplates gun drilling the bore portions 16 from opposite axial directions in each roll section. Therefore, with a cylindrical roll 10 having a length of 400 inches (about 10 m), four to six roll sections, with corresponding lengths of about 100 inches (2500 mm) to about 65 inches (1650 mm) may be used. Because gun drilling is a relatively slow process, it is contemplated that a multi-spindle gun drill would be utilized and the spindle indexed circumferentially to provide the large number of required through bore portions 16 in the short roll sections 14. For example, if a total of 150 bores is required, a 30-drill spindle would require five indexed drill cycles from each axial end of the roll section. By using precision gun drilling techniques, it can be assured that the through bore portions 16 will line up within each roll section and from one roll section 14 to the next in any relative circumferential orientation of the roll sections.

In one embodiment of the invention and referring to FIGS. 4A, 4B and 5, a cylindrical pin 17 is inserted along a portion of its axial length into each of the bore portions 16 on one end of a roll section 14. The pins 17 may be tack welded if made of a weldable material, or otherwise secured in position such as by providing a knurled pin end 46 and a press fit. The roll section is then pressed together with another roll section 14 such that the opposite ends of the pins 17, acting as alignment pins, enter the open bore portions 16 in the other roll section.

Preferably, the roll sections 14 are provided with end chamfers 18 to define annular frustoconical edge portions 20. The cylindrical pins 17 are also pre-grooved, as by milling, to form in each a flat-bottom V-notch 21 having edge surfaces 22 which match the chamfered edge portions 20 on the roll sections 14. Each of the pins 17 is inserted into the end of a bore portion 16 until the edge surface 22 matches the chamfer and is then secured in place with a press fit or a tack weld. An adjacent roll section 14 is pressed onto the pins which enter the ends of the bore portions 16 until the roll sections abut end-to-end with no gap. If necessary, the free ends 47 of the pins 17 may be ground or otherwise formed with a slightly reduced diameter to accommodate the required tight fit between roll sections. The resulting continuous annular groove 24 in the joined outer surfaces of the roll sections 14 is then filled with a continuous circumferential weld 19, such as a submerged arc weld, utilizing the pre-grooved portions of the pins 17 to provide the necessary backing for a weld depth of adequate strength. The weld surface may be ground off and the OD of the cylindrical roll 10 machined to a final desired run out and finish.

If the through bore portions 16 are drilled to leave a surface clearance between the bores and the outer roll surface 12 of about ¼ inch (about 6 mm), the pins will provide sufficient backing material depth to assure an adequate weld. After welding is completed, the pins 17 are drilled out using any suitable drilling technique.

It is also possible to utilize alignment and backing pins 17 which are not pre-milled to form notches 21. Instead, the plain cylindrical pins may be tack welded in place, the roll sections 14 pressed together, and the flat bottom V-notches 21 machined in the pins just prior to welding. Although weldable metal pins are preferred, non-weldable material, such as carbon, may be used.

An interior V-groove 29, defined by end chamfers 39, is also formed along the interior line of abutment of the roll sections 14. The groove 29 is filled with a continuous circumferential weld, similar to outer weld 19.

Referring now to FIGS. 3 and 6–8, an alternate and presently preferred embodiment of the method of the present invention is shown for providing through bore alignment and coaxial alignment of the roll sections 14. In this embodiment, a single alignment pin 26, which may be the same as the pin 17 of the previously described embodiment, provides the alignment of the through bore portions 16 when the roll sections 14 are brought together. In addition, each of the abutting edges of the cylindrical roll sections 14 is provided with a cylindrical pilot surface to provide concentric alignment of the roll sections. Specifically, the roll sections 14 are first provided with outer end chamfers 27 and inner end chamfers 28 to define, in the assembled sections, respective outer and inner weld grooves 30 and 31. In addition, the ends of the roll sections 14 are machined to provide an inner annular cylindrical shoulder 32 on one roll section and a mating outer annular cylindrical shoulder 33 on the other roll section 14. As the two cylindrical roll sections are brought together, the alignment pin 26 provides alignment of the through bore portions 16 and the mating annular shoulders 32 and 33 provide concentric coaxial alignment of the roll sections 14.

All of the remaining through bore portions 16 (except the two commonly occupied by the single alignment pin 26) are provided with short stub pins 34 of the type shown in FIG. 7 which are pressed into the ends of the bore portions 16. Each of the stub pins 34 has a flat end face 35 such that opposing stub pins 34 abut in face-to-face contact when the roll sections are brought together. Each of the stub pins 34 is also preferably pre-grooved to form a half portion 36 of a V-notch 37 defined in the assembled roll sections. As in the previously described embodiment, the V-notches 37 coincide with the outer end chamfers 27 to define the outer weld groove 30. Similarly, the inner end chamfers 28 define the inner weld groove 31.

The stub pins 34 are inserted with a tight press fit to hold them securely in place during alignment and welding of the roll sections 14. The cylindrical pin ends 54 may be knurled for this purpose. Outer and inner circumferential welds 50 and 51 are then applied to the respective weld grooves 30 and 31, as previously described. The stub pins 34 and the grooved alignment pin 26 provide backing material for the outer weld and, as also previously described, the pins are drilled out after welding.

Figure 9A:
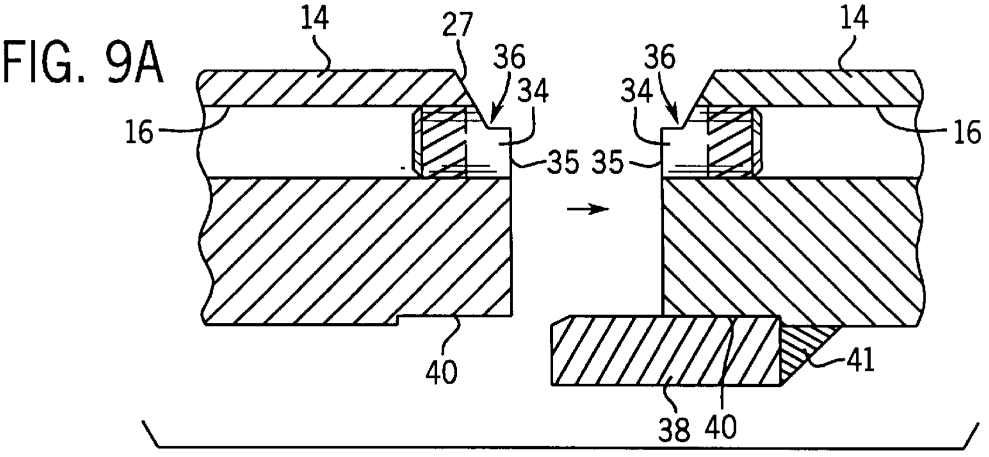
FIGS. 9A and 9B are sectional details of another embodiment of the invention.
Figure 9B:
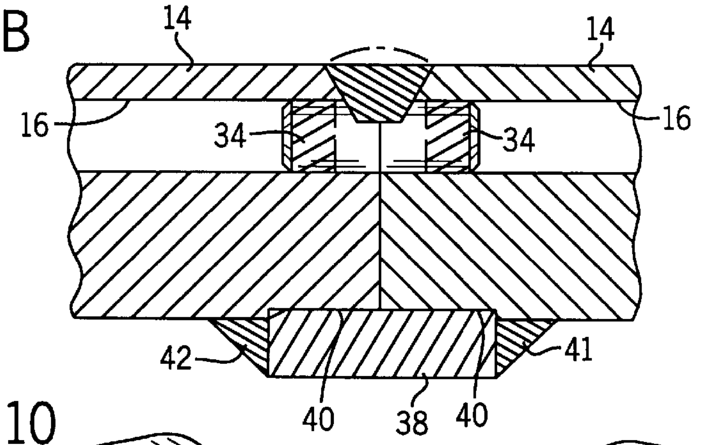
Figure 10:
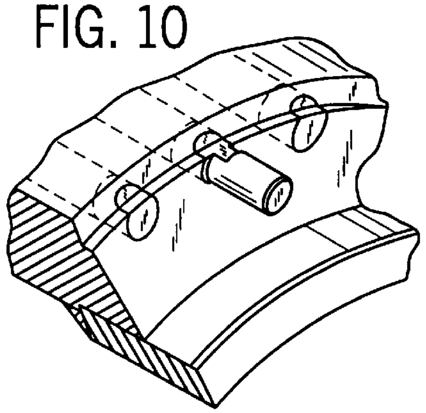
FIG. 10 is a detailed perspective view of a portion of one cylindrical roll section used in the embodiment of FIGS. 9A and 9B.

FIGS. 9A, 9B and 10 show an alternate arrangement for providing concentric alignment of the cylindrical roll sections 14 and for providing the inner weld on the joined sections. In this embodiment, either of the bore portion alignment methods, utilizing multiple cylindrical pins 17 or a single alignment pin 26 and stub pins 34, may be utilized. An annular pilot ring 38 is precisely fit along one-half of its axial length onto the inner cylindrical surface 40 of one roll section 14. The pilot ring 38 may be attached with a shrink fit or the mating surfaces may be precisely machined. One axial end of the ring is then welded to the inner surface of the roll section with a first circumferential weld 41. The opposite axial end of the pilot ring 38 is then turned or otherwise machined, if necessary, for a tight close fit on the inner cylindrical surface 40 of the other roll section 14. Alternately, the cylindrical surface 40 may also be machined to accept the OD of the ring 38 with a tight fit. The ring is then welded to the other roll section 14 with a second circumferential weld 42.

Figure 12:
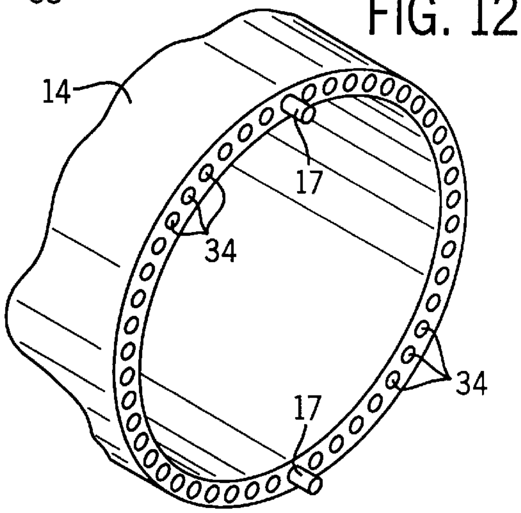
FIGS. 11 and 12 are details of a further embodiment of the invention.
Figure 11:
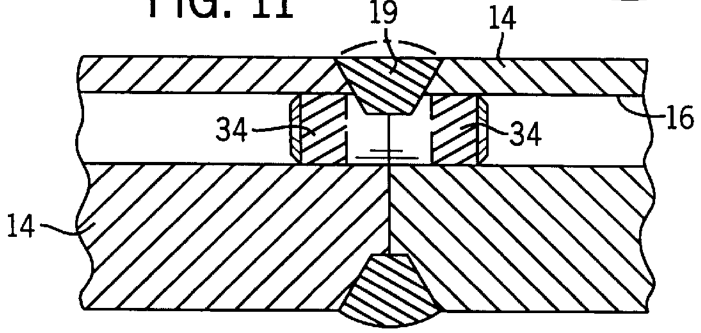

It is also possible to provide alignment of the through bore portions 16 by placing alignment marks or other indicia on the abutting edges of the cylindrical roll sections 14. Such alternate alignment means would, of course, eliminate the need for any pilot pin(s). Alternately and as shown in FIG. 12, alignment of the through bore portions and simultaneous axial alignment of the cylindrical roll sections may be accomplished with a pair of alignment pins 17 of the type shown in FIG. 5. The remaining bore portions may be closed with stub pins 34 of the type shown in FIG. 7. The two roll sections 14 are brought together and welded as previously described and as shown in FIG. 11.

As many cylindrical rolls 14 as may be necessary to attain the desired axial length of the roll 10 may be joined utilizing the methods described herein. The methods for aligning the bore portions 16 between roll sections assures that continuous through bores 15 are provided in the completed roll. The outer cylindrical surface 12 of the completed roll 10 may be suitably finished by grinding the outer circumferential welds 19 and machining the outer cylindrical surface 12 to the desired finish.

We claim:

1. A method for fabricating a roll having a cylindrical outer wall defined by outer and inner cylindrical surfaces between which surfaces are formed a plurality of circumferentially spaced, parallel and axially extending through bores, the method comprising the steps of:

(1) forming a pair of cylindrical roll sections each having a plurality of through bore portions;

(2) aligning the cylindrical roll sections in circumferential abutting relation to lie generally on a common axis and with the bore portions generally aligned to define said through bores;

(3) plugging the abutting ends of adjacent bore portions with plugs of a weld backing material;

(4) forming a common outer annular weld groove defined by outer cylindrical surface edge portions of said cylindrical wall sections and radially outer surface portions of the backing material plugs; and, (5) applying a continuous weld to the groove.

2. The method as set forth in claim 1 wherein the cylindrical roll sections are formed of steel, and including the step of drilling said through bore portions.

3. The method as set forth in claim 2 wherein said drilling step comprises drilling axially aligned holes from opposite edges of the cylindrical roll sections.

4. The method as set forth in claim 1 wherein said aligning step comprises:

(1) connecting a pair of aligned bore portions with a pilot pin; and, (2) providing the abutting edges of said cylindrical roll sections with respective mating cylindrical pilot surfaces concentric with said common axis.

5. The method as set forth in claim 1 wherein said plugging step comprises inserting a stub pin into each of said abutting ends of adjacent bore portions, said stub pins having opposed faces which abut in said aligning step.

6. The method as set forth in claim 5 wherein said stub pins are held in the bore portions with an interference fit.

7. The method as set forth in claim 5 including the step of providing said stub pins with surface portions defining, when inserted and after said aligning step, said radially outer surface portions.

8. The method as set forth in claim 7 wherein the forming step includes the step of chamfering said cylindrical roll sections to form said surface edge portions prior to said aligning step.

9. The method as set forth in claim 1 including the steps of:

(1) forming a common inner annular weld groove defined by inner cylindrical surface edge portions of said roll sections; and, (2) applying a continuous weld to said inner groove.

10. The method as set forth in claim 1 including the additional step of removing the plugs after welding.

11. The method as set forth in claim 10 wherein said plugs comprise pins, and said removing step comprises redrilling the bore portions containing said pins.

12. A method for fabricating an axially long, large diameter cylindrical roll shell defined by outer and inner cylindrical surfaces from axially shorter cylindrical roll sections, said method comprising the steps of:

(1) forming a plurality of circumferentially spaced, parallel and axially extending bores through said roll sections;

(2) aligning two roll sections in end-to-end abutment on a common axis and with the bores in axial alignment;

(3) inserting cylindrical pins of a backing material into the axial ends of the bores of said two roll sections, such that said pins substantially fill adjacent abutting bore ends;

(4) forming an annular groove in the outer cylindrical surface on the line of roll section abutment and to a depth extending into said pins; and, (5) welding the sections together by applying a continuous weld to the groove.

13. The method as set forth in claim 12 wherein said aligning step comprises utilizing at least one of said pins as a common pilot pin bridging the sections and extending into both adjacent bore ends.

14. The method as set forth in claim 12 wherein said inserting step comprises:

(1) rigidly securing one of the ends of the pins in the bore ends of one roll section prior to said aligning step; and, (2) causing the opposite ends of the pins to enter the bore ends of the other roll section in the aligning step.

15. The method as set forth in claim 14 wherein the outside diameter of the opposite ends of said pins are sized to provide a slip fit in said other bore ends.

16. The method as set forth in claim 12 including the step of additionally welding the roll sections together along abutting inner cylindrical surface portions.

17. The method as set forth in claim 16 wherein said additional welding step comprises:

(1) forming an annular pilot ring with outer diameter surface portions providing a tight fit on adjoining inner cylindrical surface portions of said roll sections; and, (2) welding opposite axial ends of said ring to the respective inner cylindrical surface portions.

18. The method as set forth in claim 12 wherein the backing material comprises a weldable metal.

19. The method as set forth in claim 18 wherein the metal comprises steel.

20. The method as set forth in claim 12 wherein the backing material comprises an electrically conductive nonmetal.

* * * * *